United States Patent Office 3,424,782
Patented Jan. 28, 1969

3,424,782
PROCESS FOR THE SELECTIVE PRODUCTION OF UNSATURATED ALIPHATIC NITRILES
Tadashi Ohmori, Kawasaki-shi, and Tsutomu Kuwata, Tokyo, Japan, assignors to Nippon Oil Company, Limited, Tokyo, Japan
No Drawing. Filed Mar. 28, 1966, Ser. No. 537,704
Claims priority, application Japan, Mar. 31, 1965, 40/18,283
U.S. Cl. 260—465.3       4 Claims
Int. Cl. B01j 11/74; C07c 121/02, 121/10

ABSTRACT OF THE DISCLOSURE

A process for the selective production of nitriles, such as acrylonitrile, from an olefin, such as propylene, by contacting a mixture of ammonia, oxygen and an olefin in the vapor phase with an oxidation catalyst, in which the active components of the catalyst are at least one member of the combinations comprising Mo-Co, Ni-Mo-Co, P-Bi-Mo, P-Bi-Mo, P-Bi-Mo-Ca, P-Mo and Sn-Sb; the improvement wherein said catalyst is caused to react with at least one sulfur component selected from elementary sulfur, hydrogen sulfide and sulfur dioxide at a temperature below 600° C.

---

The present invention relates to a process for selectively producing unsaturated aliphatic nitriles, more specifically to a process for selectively producing acrylonitrile and methacrylonitrile from propylene and isobutylene, respectively, by a vapor phase ammo-oxidation reaction.

There have already been presented many reports as regards the method for producing $\alpha,\beta$-unsaturated aliphatic nitriles by reacting the corresponding olefines with ammonia and oxygen (or air). However, it is generally difficult by such method to avoid the formation of the by-products such as unsaturated aldehydes, acetonitrile, hydrocyanic acid, carbon monoxide and carbon dioxide. In order to suppress such undesirable side-reaction, many attempts are now directed to the improvement of the catalysts and procedures to be employed.

We have found, in the course of exploring improved methods hereinafter discussed that when elementary sulfur and/or sulfur compounds are employed in the ammo-oxidation reaction in which an aliphatic olefin, ammonia and oxygen are caused to react in the presence of a catalyst combination consisting essentially of at least one member selected from the group consisting of Mo-Co, Ni-Mo-Co, P-Bi-Mo, P-Bi-Mo-Ca, P-Mo- and Sn-Sb, the unsaturated nitriles aimed at are obtained with good selectivity by suppressing the formation of by-products such as hydrocyanic acid, acetonitrile and carbon dioxide, and further the catalytic reaction temperature can be controlled with ease.

This invention is intended to provide a new and useful process for selectively producing unsaturated aliphatic nitriles.

According to the process of this invention, acrylonitrile and methacrylonitrile useful as starting materials for the production of high polymers are produced by catalytically reacting the corresponding aliphatic olefins, i.e., propylene and isobutylene with ammonia and oxygen in the presence of a solid oxidation catalyst as aforementioned and further in the presence of elementary sulfur and/or sulfur compounds.

Examples of said sulfur compounds applicable to the process of the invention include various inorganic and organic sulfur compounds such as hydrogen sulfide, sulfur dioxide, sulfur trioxide, sulfonic acids, compounds of thiophene group, mercaptans, sulfites and sulfonium compounds.

These elementary sulfur and/or said sulfur compounds are intended to treat therewith said oxidation catalyst at temperatures ranging from room temperature to 600° C., preferably from 200° C. to 500° C. The catalyst may be treated either prior to or during the ammo-oxidation reaction.

It has not yet been ascertained how such effective reaction is brought about by adding elementary sulfur and/or said sulfur compounds into the reaction system. However, experiments by X-ray diffraction analysis showed that elementary sulfur or sulfur compound together with metallic components of the catalyst forms an addition product or a complex compound. Therefore, that the selective ammo-oxidation reaction may be attributed to the donation and acceptance of electrons of elementary sulfur and/or said sulfur compounds in the reaction system. The concentration of olefine in the feed may be widely varied, for example from 1 to 20 molar percent, preferably from 2 to 10 molar percent.

Oxygen concentration in the reaction system may be changed in a wide range, for example, 1–20 molar percent, preferably 2–15 molar percent. The oxygen may be diluted with other inert gases, for example, with air.

The concentration of ammonia in the reaction system may be varied within the range of 2–20 molar percent, although the molar proportion of ammonia to the feed olefine is advantageously more than 1.

The reaction may be carried out at a temperature ranging from 300° C. to 600° C., but advantageously from 350° C. to 550° C.

The contact time may be within 0.2–20 seconds, especially within 0.5–10 minutes. The present invention is further illustrated in the following examples.

EXAMPLE 1

50 ml. of a commercial desulfurized catalyst (2.5 wt. percent NiO, 2.5 wt. percent CoO, 10.0 wt. percent $MoO_3$ and alumina carrier of 9–20 mesh particle size) was introduced into a U-shaped "Pyrex" reaction vessel immersed in a liquid bath maintained at 400° C. A gas comprising 4 molar percent of propylene, 5 molar percent of ammonia and 91 molar percent of air was subjected to reaction in the catalyst packed vessel under the condition of about 1.8 seconds of contact time at a rate of 100 liters per hour. The resulting product was, for the most part, carbon dioxide with relatively small amounts of acrolein, acetonitrile, and propionitrile.

Whereas, according to the invention better results may be obtained with the catalyst treated at 400° C. for 2 hours with elemental sulfur and hydrogen gas, respectively, at the rate of 0.8 g. per hour and 50 liters. The treated catalyst was, in this example, treated with 50 liters of air for further one hour at the same temperature.

Then, a starting gas of the same composition was catalytically reacted by passage through a vessel filled with the treated catalyst under similar reaction conditions, whereby about 45 molar percent of feed propylene was noted to have participated in the reaction. Calculations on the basis of feed propylene showed a yield of 20 molar percent of acrylonitrile, 3 molar percent of carbon dioxide and 5 molar percent of acetonitrile, with traces of propionitrile.

Experiments revealed that the use of treated catalyst suppresses undesirable side reactions which would otherwise develop in this type of reaction and helps increasing the yield of the desired acrylonitrile.

EXAMPLE 2

50 ml. of bismuth phosphomolybdate prepared according to the process in the Example 1 of U.S. Patent No. 2,904,580 was introduced into a normal oxidation vessel maintained at 450° C. under atmospheric pressure. A gas comprising 10 molar percent of propylene, 70 molar percent of air, 10 molar percent of ammonia and 10 molar percent of steam was subjected to reaction in the catalyst packed vessel under the condition of about 3.6 seconds of contact time at a rate of 50 liters per hour. The yields of the reaction products calculated on the basis of the feed propylene with respect to carbon content are listed below:

|  | Molar percent |
|---|---|
| Acrylonitrile | 20 |
| Acetonitrile | 2.5 |
| Acrolein | 2.0 |
| Carbon dioxide | 7.0 |

Whereas, according to the invention, better result was obtained by introducing 0.5 molar percent of sulfur dioxide (0.25 liter per hour) into the reaction system. In this case, no acrolein was produced and the formation of carbon dioxide was considerably suppressed. The yields of the products calculated on the basis of the feed propylene with respect to carbon content are listed below:

|  | Molar percent |
|---|---|
| Acrylonitrile | 25 |
| Acetonitrile | 2.5 |
| Acrolein | 0 |
| Carbon dioxide | 1 |

EXAMPLE 3

50 ml. of a commercial desulfurized catalyst (3.6 wt. percent CoO, 10 wt. percent $MoO_3$ and alumina carrier of 8–16 mesh particle size) was added into 50 ml. of 2 percent solution of potassium hydroxide at room temperature and the mixture was dried at 80° C. while stirring well and then cooled. 50 ml. of the catalyst thus prepared containing an alkali metal was introduced in the U-shaped "Pyrex" reaction vessel immersed in a liquid maintained at 380° C. A gas comprising 4 molar percent of isobutylene, 5 molar percent of ammonia and 91 molar percent of air was subjected to reaction in the catalyst packed vessel under the condition of about 3.6 seconds of contact time under atmospheric pressure.

The resulting products were, for the most part, carbon dioxide with relatively small amounts of methacrylonitrile, methacrolein and acetonitrile.

Whereas, according to the invention, better results may be obtained with the catalyst initially treated at 380° C. for 2 hours with 0.5 liter of hydrogen sulfide and 1.0 liter of ammonia. The treated catalyst was in this example treated further with 2 liters of air at the same temperature, the air being introduced at the rate of 30 liters per hour.

Then, a starting gas of the same composition was catalytically reacted by passage through the vessel filled with the treated catalyst under similar reaction conditions, whereby about 50 molar percent of the feed isobutylene was noted to have participated in the reaction.

Calculations on the basis of feed isobutylene showed a yield of 8 molar percent of methacrylonitrile, 1 molar percent of methacrolein, 2 molar percent of acetonitrile, 1 molar percent of hydrocyanic acid and 4 molar percent of carbon dioxide.

EXAMPLE 4

The bismuth calcium phosphomolybdate catalyst was prepared by the following manner. A solution of 10 ml. of concentrated nitric acid, 2 ml. of 85 percent phosphoric acid, 150 g. of bismuth nitrate hydrate, 60 g. of molybdate oxide and 2 g. of calcium oxide in 1000 ml. of water, was added to 70 g. of aqueous colloidal silica sol containing 30 percent silica and the whole was mixed well to give a paste. Thereafter, the mixture was evaporated to dryness, calcined at 550° C. for 16 hours in an electric oven and crashed into particles of 9–20 mesh to obtain the aimed catalyst. A starting gas comprising 4 molar percent of isobutylene, 6 molar percent of ammonia and 90 molar percent of air was subjected to reaction in the catalyst packed vessel at 430° C. under atmospheric pressure at a rate of 50 liters per hour (space velocity of the gas 1000 h.$^{-1}$), whereby 40 molar percent of feed isobutylene remained unchanged and 5 molar percent of the feed isobutylene was unknown loss.

The result obtained from gas chromatographical analysis of the products are shown below:

| Yields (on the basis of feed isobutylene): | Molar percent |
|---|---|
| Methacrylonitrile | 12 |
| Methacrolein | 28 |
| Acrylonitrile | 3 |
| Acetonitrile | 3 |
| Acrolein | 1 |
| Hydrocyanic acid | 1 |
| Carbon dioxide | 7 |

The yield of methacrylonitrile was 20 molar percent against changed isobutylene.

Whereas, according to the invention, better results may be obtained with the catalyst initially treated at 430° C. for two hours with hydrogen sulfide diluted by nitrogen gas to 2 percent strength at a rate of 1 liter per hour. The treated catalyst was in this example calcined for further one hour while introducing air with a rate of 10 liter per hour. Then, a starting gas of the same composition was subjected to reaction in the vessel filled with the treated catalyst under the similar reaction conditions.

A gas chromatographical analysis of the product showed that the yield of methacrylonitrile has considerably increased, though the yield of methacrylonitrile tends to decline with time, while the yield of methacrolein increases. This indicates that the catalyst tends from treated to untreated state. By continuously introducing sulfur dioxide to the reaction system together with the starting gas at a rate of 0.2 liter per hour, the following products were obtained.

Yields (on the basis of the feed isobutylene):

|  | Molar percent |
|---|---|
| Methacrylonitrile | 40 |
| Methacrolein | 2 |
| Acrylonitrile | 2 |
| Acrolein | 0 |
| Acetonitrile | 2 |
| Hydrocyanic acid | 0.5 |
| Carbon dioxide | 2 |

45 molar percent of feed isobutylene remained unchanged. The unknown loss of the feed isobutylene was 6.5 molar percent. The yield of methacrylonitrile was 73 percent against the changed isobutylene. Experiments showed that the undesirable methacrolein and carbon dioxide were considerably suppressed. With the reaction continued for further 150 hours, there has been noted no appreciable change in the catalytic performance.

EXAMPLE 5

207.8 g. of phosphomolybdic acid were dissolved in water, to the solution obtained were added 180 g. of diatomaceous earth and the whole was heated to dryness while stirring well and then calcined at 500° C. for 16 hours while introducing air. The catalyst thus obtained was crashed and sieved to particles of 10–50 mesh. A gas comprising 4 molar percent of isobutylene, 6 molar percent of ammonia, and 90 molar percent of air was catalytically caused to react in an ordinary oxidation reaction vessel filled with 50 g. of the catalyst at a temperature of 450° C. and at a gas space velocity of 3000 l./hr. Calculations on the basis of the feed isobutylene showed a yield of 15 molar percent of methacrylonitrile, 12 molar percent of acetonitrile and 13 molar percent of carbon dioxide.

Whereas, according to the invention, better results may be obtained with the catalyst initially treated with sulfur dioxide. The catalyst was in this example caused to react at 450° C. for 2 hours with a gas comprising sulfur dioxide, ammonia and nitrogen whereby said sulfur dioxide, ammonia and nitrogen were introduced at the rates of 0.5 liter per hour, 0.5 liter per hour and 30 liters per hour, respectively. The treated catalyst was calcined at 450° C. for further one hour in the presence of about 30 liters of air constantly supplied.

Then, a starting gas of the same composition was subjected to reaction in the vessel filled with the treated catalyst under the same reaction conditions. Calculations on the basis of the feed isobutylene showed a yield of 23 molar percent of methacrylonitrile, 8 molar percent of methacrolein, 7 molar percent of acetonitrile and 6 molar percent of carbon dioxide.

Thus, experiments showed that use of the catalyst treated with sulfur dioxide suppressed the formation of carbon dioxide and helped increasing the yield of methacrylonitrile.

EXAMPLE 6

A tin-antimony catalyst was prepared in the manner described in the Example 2 of U.S. Patent No. 3,152,170. The catalyst was calcined at 700° C. for 20 hours while introducing air. A mixed gas comprising 8 molar percent of propylene, 10 molar percent of ammonia, 50 molar percent of air and 32 molar percent of steam was catalytically caused to react under the condition of about 5 seconds of contact time at 475° C. in the ordinary oxidation reaction vessel filled with 50 g. of the catalyst.

Calculations on the basis of feed propylene showed a yield of 55 molar percent of acrylonitrile, 1 molar percent of acrolein, 2 molar percent of acetonitrile and about 24 molar percent of the sum of carbon monoxide and carbon dioxide.

Whereas, according to the invention, better results may be obtained with the catalyst initially treated with hydrogen sulfide. The catalyst was in this example treated at 500° C. for 2 hours with a gas comprising hydrogen sulfide and nitrogen whereby hydrogen sulfide and nitrogen were introduced with the rates 0.5 liter per hour and 0.3 liter per hour, respectively. Thereafter, the treated catalyst was calcined for another hour in the presence of about 30 liters of air constantly supplied.

Then, a starting gas of the same composition was subjected to reaction in a vessel filled with the treated catalyst under the same reaction conditions.

Calculations on the basis of the feed propylene showed a yield of 64 molar percent of acrylonitrile, 0.2 molar percent of acrolein, 2 molar percent of acetonitrile, 3 molar percent of hydrocyanic acid and about 12 molar percent of the sum of carbon monoxide and carbon dioxide.

Having thus described, it will be understood that the catalyst treated with hydrogen sulfide according to the invention exhibits the peculiar effect of suppressing the combustion reaction on one hand and increasing the yield of desired acrylonitrile on the other.

What we claim is:

1. In a process for the selective production of acrylonitrile and methacrylonitrile from propylene and isobutylene, respectively, which comprises contacting a mixture of ammonia, oxygen and an olefin selected from the group consisting of propylene, isobutylene and mixtures thereof, in the vapor phase at a temperature within the range from about 300° C. to about 600° C. in the presence of an oxidation catalyst combination consisting essentially of Mo-Co, Ni-Mo-Co, P-Bi-Mo, P-Bi-Mo-Ca, P-Mo or Sn-Sb, the improvement wherein said catalyst is reacted with at least one sulfur substance selected from the group consisting of elementary sulfur, hydrogen sulfide and sulfur dioxide at a temperature below 600° C.

2. A process as claimed in claim 1, in which said catalyst combination is reacted with said sulfur substance prior to said reaction at a temperature below 600° C.

3. A process as claimed in claim 1, in which said sulfur substance is introduced into said reaction system during the reaction.

4. A process as claimed in claim 1, in which said olefin, ammonia and oxygen gas mixture is incorporated with inert gases.

References Cited

UNITED STATES PATENTS

| | | | |
|---|---|---|---|
| 3,086,041 | 4/1963 | Hadley et al. | 260—465.3 |
| 3,197,419 | 7/1965 | Callahan et al. | 260—465.3 X |
| 3,282,982 | 11/1966 | Callahan et al. | 260—465.3 |
| 3,287,394 | 11/1966 | Young et al. | 260—465.3 |
| 3,293,279 | 12/1966 | Young et al. | 260—465.3 |
| 3,308,151 | 3/1967 | Callahan et al. | 260—465.3 |

JOSEPH P. BRUST, *Primary Examiner.*

U.S. Cl. X.R.

252—436, 439; 260—604